United States Patent Office 3,336,176
Patented Aug. 15, 1967

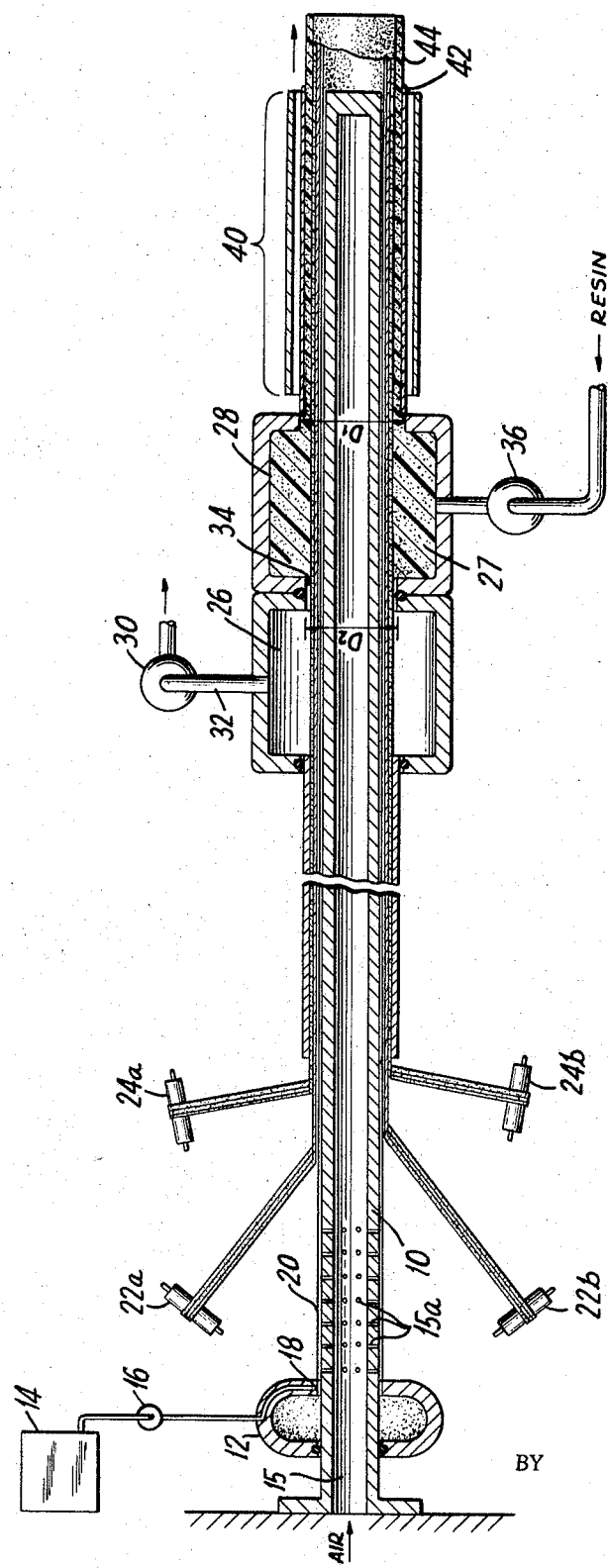

3,336,176
PROCESS FOR MAKING CONTINUOUS PIPE
Jonas Medney, Oceanside, N.Y., assignor to Koppers Company, Inc., a corporation of Delaware
Filed July 27, 1962, Ser. No. 212,868
8 Claims. (Cl. 156—173)

This invention relates to the manufacture of continuous pipe, and is particularly concerned with an improved method and apparatus for producing continuous pipe of the type having a monolithic cylindrical wall composed essentially of filament windings bonded with a resinous material.

An integrally formed pipe body comprising continuous strands of fiber reinforced by a resinous material has heretofore been manufactured by various and sundry methods. Many improvements of a basic nature have been introduced in this field, and a need yet exists for additional improvements. Nevertheless, a still greater need exists for long lengths of pipe in the process industries, oil wells and the like.

One advantage in a long continuous length of pipe is the reduction in the number of joints required. This is advantageous from the point of view of cost, which is an important consideration, and improved reliability, as leaks are quite liable to occur at a joint.

Accordingly, the principal object of this invention is to provide a manufacturing process for the production of such pipe in a continuous length.

Another object of this invention is to improve manufacturing techniques so that pipe having the required strength characteristics may be produced economically at a high rate of production.

Yet another object of this invention is to provide an improvement in continuous pipe that may be made with a relatively thin wall while having substantial strength in both compression and tension and will additionally possess a high rigidity or beam stiffness.

A particular object is to provide a continuous process for making filament-wound pipe wherein the filaments are impregnated with resin after air has been substantially removed from the filaments by vacuum process.

These and other objects and advantages of the invention will, in part, be pointed out with particularity and will, in part, become obvious from the detailed description of the preferred embodiment of the method and apparatus of the invention, taken in conjunction with the accompanying drawing, which forms an integral part thereof.

The drawing shows a semi-diagrammatic side elevational view of a preferred apparatus for producing pipe in accordance with the method of the invention.

Referring to the drawing, there is shown a bored mandrel designated by the reference character 10. The head of an extruder 12 (shown in section) surrounds the mandrel. In a preferred embodiment, a thermoplastic synthetic resin material, contained in molten form, in vessel 14, is forced under pressure from pump 16 so that it passes through an orifice 18 of extruder 12 onto the mandrel 10. Alternatively, the liner can be formed using thermoplastic tape, formed on the mandrel by means of a tape winder which is then sealed into a tube. Likewise sheet plastic may be sealed into a tube.

The extruded plastic is exceptionally thin, say 3 to 5 mils, and is forced along the mandrel and out over the free end. This plastic serves as a liner 20 for the pipe. It facilitates the removal of the finished pipe from the pipe-forming mandrel after the pipe has been treated to cure or set the resin added in a later step, to be described hereinafter. Moreover, in some instances, the plastic liner may serve to make the pipe more impervious to the fluids it is designed to convey. In addition, the plastic liner may be chosen to afford chemical protection.

Provision is made for a thin film of lubricating fluid between the outer surface of the mandrel and the plastic liner. This allows the plastic liner to slide along the mandrel quite easily.

In the absence of this remedial feature, the frictional engagement of the outer surface of the mandrel with the plastic liner would prevent the liner from moving freely along towards the free end of the mandrel. The lubricant results in markedly reduced friction.

The lubricating fluid may be either a gas or a liquid. A preferred gas is compressed air. A preferred liquid is an oil. Water may also be advantageously used as a lubricant. Nevertheless, air is to be preferred, due to its low cost.

The lubricating fluid is supplied through the longitudinal bore 15 of the mandrel 10. The lubricant is fed into the bore 15 at the supported end of the mandrel, and flows through the bore towards the free end of the mandrel. Along the length of the bore, at spaced intervals, a group of bores 15a radiate towards the outer surface of the mandrel, in the manner of hollow spokes radiating from a central hub towards a rim. There is formed a thin film of lubricant, say, a few thousandths of an inch thick, along the length of the mandrel, between its outer surface and the plastic liner. If the lubricant is compressed air, it is simply discharged to the atmosphere at the free end of the mandrel. If it is oil, it is discharged from the bore and recycled back to the supported end of the mandrel. This recycling scheme is not shown in the drawing, since air is employed in the preferred embodiment.

As the liner 20 advances along the mandrel, it passes through a number of banks of rotating winders and stationary creels. At least one stationary creel of each of a number of banks applies longitudinally-oriented fibers. The provision of longitudinally-disposed fibers considerably increases the rigidity or beam stiffness of the pipe as compared with a similar pipe without the inclusion of this feature. The stationary creels applying longitudinal fibers are designated by the reference characters 22a, 22b, etc. The rotating winders 24a, 24b, etc., put on a nearly hoop oriented wrap. Members 22a and 24a form a bank of winders, as do 22b and 24b, etc. The number of stationary creels in each bank putting on longitudinally-disposed fibers, and the number of rotating winders in each bank putting on nearly vertical wraps may be varied at will in accordance with the purpose to be served by the pipe. A suitable number of banks are provided to build up the pipe wall to the desired thickness. Each rotating winder applies a band width that is equal to the pitch of the helix. In this manner, a complete layer of glass is continuously layed on the mandrel.

The liner together with the surrounding windings now proceeds along the mandrel. It enters a vacuum chamber 26, in which the vacuum is maintained under a subatomspheric absolute pressure corresponding to 10 mm. of mercury, or better. The vacuum is created by exhaust pump 30 coupled to the chamber 26 by means of pipe 32. Alternatively, other exhausting systems may be employed. The air is thus exhausted from the interstices of the filament-wound structure. The vacuum chamber 26 communicates with a resin chamber 28 by means of an annular guard chamber or throat 34. The annular guard chamber is closely spaced with respect to the outer diameter of the windings. If a friction fit it not suitable because of a particular filament employed for the winding, then the inner diameter of the annular guard chamber may be perhaps 0.005" to 0.01" greater than the outer diameter of the windings. The unfinished pipe passes, in turn, through both the annular guard chamber and the resin chamber.

The resin 27 in chamber 28 is under a relatively high pressure, namely, between 100 and 5000 p.s.i.a., provided by pump 36. This serves to force resin into the windings. The conditions of impregnation must be controlled carefully.

Prior methods of forming pipe by filament winding techniques require that the filaments be wet with the bonding resin prior to winding. On the other hand, the process of this invention winds the filament in dry condition. This permits the application of a more uniform and denser winding. If the filament employed is glass, it is advantageous to use a maximum amount of glass and a minimum amount of resin in order to achieve maximum strength. By winding in a dry condition, the amount of resin used may be kept to a minimal amount. A further advantage is the use of materials in their basic form, e.g., glass fiber and synthetic resin.

The dry winding procedure, coupled with the use of a vacuum and subsequent pressure impregnation, is far superior to the prior method of using resin wet filaments in that a substantially less porous structure for a wall of equal thickness is obtained. High pressure is necessary in order to obtain penetration of the interstices of the closely wound filaments. Furthermore, the pressure aids in pushing the pipe out of the machine.

It is to be noted that in the absence of the evacuation step, while the surface of the pipe would be coated with resin, the resin would not uniformly penetrate into the interstices of the pipe. Thus it is seen that the use of a dry winding in combination with the steps of vacuum and subsequent pressurization is an essential feature of the method of this invention for producing pipe of the highest quality. For less critical applications, the vacuum step may be omitted and still a superior pipe will be obtained.

The resin employed could be identical with the plastic force of the pressure is in a direction such as to push the ting epoxy, or polyester phenolic. However, it is generally a different resin. The only requirement is that the two be non-reactive.

The resin chamber 28 is defined by an annular ring or inner diameter $D_1$. It is essential that the inner diameter $D_1$ be greater than the inner diameter $D_2$ of the annular guard chamber to prevent the flow of resin into the vacuum chamber 26. Also, by having $D_1$ greater than $D_2$, the net force of the pressure is in a direction such as to push the pipe through the machine. It is to be noted that the resin forms a seal at ring $D_2$, due to distribution of pressure combined with the forward movement of the pipe. There is no leakage of resin since the pipe is withdrawn at a rate equal to or greater than the rate of resin travel from chamber 28 to chamber 26 due to vacuum. As the pipe leaves chamber 28, it enters tubular steel die 42 which smooths the surface of the plastic coating 44 surrounding the pipe.

The unfinished pipe then passes through a curing section 40 which is provided with heating means for affecting the cure of the resin. The curing cycle chosen depends on the materials used and the application intended for the pipe. While the curing section is shown surrounding the pipe, it will be appreciated that it may be situated downstream from member 42.

It is seen that a continuous length of pipe is produced on a relatively short and stationary mandrel. Since the pipe possesses a high rigidity or beam stiffness, it may be cantilevered and fed directly onto flatcars for shipment, or laid continuously in a field application. The pipe may easily be cut into sections of any desired length by conventional cutting means. The liner may be left in or may easily be stripped out.

The choice of a plastic type material for the liner offers wide latitude. The preferred material is polyvinyl alcohol. Other materials that may be advantageously used include polyethylene and polypropylene.

Although numerous different types of fibrous materials may be used, nevertheless, glass fibers are preferred. Glass fibers may be economically produced in substantially continuous lengths in microscopic diameters.

In any case, the layers of fiber are exceptionally thin, say 10 to 20 mils, so that even though the pipe is cross-laminated with a substantial number of layers to afford a high bursting strength, the pipe wall is relatively thin.

The mandrel structure is subject to various modifications. The mandrel may be formed by processes well known in the art. In any event, a bored mandrel is preferably employed to permit the carrying of a lubricant.

For resinous material, it is presently preferred to use a so-called epoxide resin. Epoxide compounds are those compounds having an ether oxygen atom joined to two vicinal carbon atoms. The term "epoxide resin," as used in the present specification and in the appended claims, denotes the resinous reaction product of certain of the epoxide compounds, and compounds having available hydrogen atoms linked to carbon atoms by oxygen atoms, as for example, polyhydric phenols and polyhydric alcohols. A particular useful epoxide resin is the reaction product of an epihalohydrin and a polyhydric phenol, as exemplified by bisphenol-epichlorohydrin. Other epoxide resins suitables for use in the manufacture of this pipe include the reaction products of epihalohydrins and a polyhydric alcohol, such as ethylene glycol, diethylene glycol, trimethylene glycol, propylene glycol, and the like. Other equivalent epoxide resins are well known to those skilled in the plastics art.

Other suitable thermosetting resins include polyester resins, and in particular, the alkyd resins comprising the reaction product or copolymers of polyhydric alcohols and dibasic acids. A resin commonly known under the trade name of "Esso Buton" is also suitable. Typical of the large number of available polyester resins are the copolymers of phthalic anhydride and a polyhydric alcohol such as ethylene glycol, diethylene glycol, or glycerin, maleic anhydride and a polyhydric alcohol, sebasic acid and a polyhydric alcohol, and diethylene glycol and bis-allyl carbonate. These and equivalent polyester resins are advantageously partially polymerized prior to use and may be modified in the manner known in the art by the admixture therewith of such modifiers as epoxidized oils and unsaturated fatty acids. If desired, suitable polyester polymerization catalysts well known to the art may also be included in the composition.

Other thermosetting polymers that can be employed in the composition of this invention include the acrylic compounds, and the phenol-formaldehyde, furfural-formaldehyde, and resorcinol-formaldehyde resins. Moreover, the thermosetting material need not be in every case solely what is commonly and rather loosely known as a "resin." For example, substances such as phthalic anhydride and diallyl phthalate may be employed as a thermosetting reactive material in the composition.

The essential consideration is that the resin type material employed be one that will be compatible with the particular fibers used, and with the use to which the pipe is to be put.

It is also to be noted that the materials referred to not only may be the individual materials referred to, but also compatible mixtures of two or more of these materials.

By the process of this invention, long lengths of pipe may be made and loaded on a train of flat cars for rapid field installation with a minimum of junctions.

The process of this invention may be carried out by equipment and supplies carried on a truck which could then travel across country laying a jointless pipe line. The increased reliability of a pipe line without joints over the conventional jointed line would be highly advantageous.

It is to be understood that various changes, omissions and additions may be made to the preferred embodiment of the invention herein described, without departing from the spirit of the invention.

What is claimed is:

1. The method for producing a continuous length of reinforced, thermosetting plastic conduit comprising the steps:
   (a) forming a synthetic resin liner over the outer surface of a mandrel;
   (b) providing a lubricating film between the outer surface of said mandrel and the inner surface of said liner subsequent to the formation of said liner whereby said liner may be advanced freely in the direction of the axis of said mandrel;
   (c) applying continuous lengths of filaments both longitudinally and helically on said liner forming a laminate structure;
   (d) advancing said laminate structure in the longitudinal direction of said mandrel;
   (e) passing said laminate structure through a vacuum chamber wherein the pressure is subatmospheric whereby intersticial air is removed from said laminate structure;
   (f) then passing said laminate structure through a chamber containing resin under positive pressure whereby the filamentary structure becomes resin-impregnated;
   (g) then passing said resin-impregnated laminate structure through apparatus wherein the resin is cured; and
   (h) removing the cured, resin-impregnated laminate structure from said mandrel.

2. The method for producing a continuous length of reinforced, thermosetting plastic conduit comprising the steps:
   (a) forming a synthetic resin liner over the outer surface of a mandrel;
   (b) introducing a lubricating fluid into the space between said mandrel outer surface and the liner inner surface whereby said liner is spaced apart from and freely movable along the length of said mandrel, said lubricating fluid being introduced at a location adjacent the zone of formation of said liner;
   (c) applying continuous elongate filament reinforcements to the outer surface of said liner to form a laminate structure;
   (d) advancing said laminate structure along said mandrel so that said structure passes through a vacuum first chamber wherein the pressure is subatmospheric and intersticial air is removed from said filamentary portion of said laminate structure;
   (e) thereafter advancing said laminate structure along said mandrel so that said laminate passes through a second chamber disposed adjacent said vacuum chamber containing thermosetting resin under a positive pressure whereby the filaments of said structure are resin impregnated; and
   (f) thereafter advancing said laminate structure along said mandrel and through a resin curing station wherein said resin is polymerized.

3. The invention of claim 2 wherein:
   (a) said first and second chambers are disposed in abutting relation.

4. The invention of claim 3 including the steps:
   (a) advancing the laminate structure through said first and second chambers at a selected rate of speed; and
   (b) simultaneously removing intersticial air from said filaments and flowing resin into said resin second chamber at such a rate and pressure that as said laminate structure advances therethrough at said selected rate of speed, no resin flows from said second chamber into said vacuum first chamber.

5. The invention of claim 2 including:
   (a) conditioning the outer surface of said laminate after the same leaves said resin chamber and before it enters said curing station.

6. The process of claim 1 wherein said filaments are glass fibers.

7. The process of claim 1 wherein said vacuum is maintained at less than 10 mm. of mercury.

8. The process of claim 1 wherein the pressure in said pressurized resin chamber is between 100 p.s.i.a. and 5000 p.s.i.a.

References Cited

UNITED STATES PATENTS

| | | | |
|---|---|---|---|
| 2,708,772 | 5/1955 | Moncrieff | 264—209 |
| 2,723,705 | 11/1955 | Collins | 156—432 |
| 2,731,067 | 1/1956 | Miller | 156—432 |
| 3,067,803 | 12/1962 | Fleury | 156—431 |
| 3,068,133 | 12/1962 | Cilker et al. | 156—171 |

EARL M. BERGERT, *Primary Examiner.*

J. P. MELOCHE, R. J. CARLSON, *Assistant Examiners.*